United States Patent
Frueh et al.

(10) Patent No.: US 9,870,621 B1
(45) Date of Patent: Jan. 16, 2018

(54) MOTION-BASED FEATURE CORRESPONDENCE

(71) Applicant: Google Inc., Mountain View, CA (US)

(72) Inventors: Christian Frueh, Mountain View, CA (US); Caroline Rebecca Pantofaru, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 14/644,023

(22) Filed: Mar. 10, 2015

Related U.S. Application Data (60) Provisional application No. 61/950,706, filed on Mar. 10, 2014.

(51) Int. Cl.
*G06T 7/00* (2017.01)
*G06K 9/00* (2006.01)
*G06T 7/20* (2017.01)
*G06K 9/62* (2006.01)
*G06T 7/246* (2017.01)

(52) U.S. Cl.
CPC .......... *G06T 7/204* (2013.01); *G06K 9/00335* (2013.01); *G06K 9/6202* (2013.01); *G06K 9/6215* (2013.01); *G06T 7/0044* (2013.01); *G06T 7/20* (2013.01); *G06T 7/246* (2017.01); *G06T 2207/10016* (2013.01); *G06T 2207/20076* (2013.01); *G06T 2207/30201* (2013.01)

(58) Field of Classification Search
CPC ................. G06T 7/204; G06T 7/0044; G06T 2207/20076; G06T 2207/10016; G06T 2207/30201; G06K 9/6202; G06K 9/6215
See application file for complete search history.

(56) References Cited

U.S. PATENT DOCUMENTS

| | | | |
|---|---|---|---|
| 7,996,771 B2 | 8/2011 | Girgensohn et al. | |
| 8,854,457 B2 | 10/2014 | De Vleeschouwer et al. | |
| 9,274,597 B1* | 3/2016 | Karakotsios | G06F 3/0346 |
| 2004/0090472 A1 | 5/2004 | Risch et al. | |
| 2009/0217315 A1* | 8/2009 | Malik | G06K 9/00362 725/9 |
| 2010/0208064 A1 | 8/2010 | Liu et al. | |
| 2011/0058028 A1* | 3/2011 | Sakai | G06K 9/00288 348/77 |

(Continued)

OTHER PUBLICATIONS

Bryan N., et al. "Clustering and Synchronizing Multi-Camera Video Via Landmark Cross-Correlation", Acoustics, Speech and Signal Processing (ICASSP), 2012, 4 pages, IEEE International Conference on IEEE, 2012.

(Continued)

*Primary Examiner* — Utpal Shah
(74) *Attorney, Agent, or Firm* — Lowenstein Sandler LLP (57) ABSTRACT

A system and method are disclosed for identifying feature correspondences among a plurality of video clips of a dynamic scene. In one implementation, a computer system identifies a first feature in a first video clip of a dynamic scene that is captured by a first video camera, and a second feature in a second video clip of the dynamic scene that is captured by a second video camera. The computer system determines, based on motion in the first video clip and motion in the second video clip, that the first feature and the second feature do not correspond to a common entity.

31 Claims, 5 Drawing Sheets

(56) References Cited

U.S. PATENT DOCUMENTS

| | | |
|---|---|---|
| 2012/0076357 A1 | 3/2012 | Yamamoto et al. |
| 2012/0198317 A1 | 8/2012 | Eppolito et al. |
| 2014/0037140 A1 | 2/2014 | Benhimane Selim et al. |
| 2014/0294361 A1 | 10/2014 | Acharya et al. |
| 2015/0220798 A1* | 8/2015 | Miyano .............. G06K 9/00369 382/115 |
| 2015/0235367 A1 | 8/2015 | Langer et al. |
| 2016/0125267 A1 | 5/2016 | Goldman et al. |
| 2017/0076153 A1* | 3/2017 | Farre Guiu ........ G06K 9/00718 |

OTHER PUBLICATIONS

Cremer, M. et al. "Machine-Assisted Editing of User-Generated Content", SPIE-IS&T, pp. 1-8, vol. 7254, Electronic Imaging, International Society for Optics and Photonics, 2009.

Kenedy, L. et al., "Less Talk, More Rock: Automated Organization of Community-Contributed Collections of Concert Videos", 1009, 10 pages, Proceedings of the 18th international conference on World wide web, ACM, 2009.

Shrestha, P. et al., "Synchronization of Multi-Camera Video Recordings Based on Audio", 2007, pp. 545-548, Proceedings of the 15th international conference on Multimedia, ACM, 2007.

Lowe D. G., "Distinctive Image Features from Scale-Invariant Keypoints", International Journal of Computer Vision, 2004, pp. 91-110, 60(2):91-110, Kluwer Academic Publishers, The Netherlands.

Agarwal, S. et al., "Building Rome in a Day", Communications of the ACM, Oct. 2011, pp. 105-112, vol. 54, No. 10, Originally published in Proceedings of the 2009 IEEE International Conference on Computer Vision, pp. 72-79. IEEE, 2009. 1.

* cited by examiner

MOTION-BASED FEATURE CORRESPONDENCE

CROSS-REFERENCE TO RELATED APPLICATIONS

This application claims the benefit of U.S. Provisional Application No. 61/950,706, entitled, "MOTION-BASED FEATURE CORRESPONDENCE," filed Mar. 10, 2014, the entire contents of which are incorporated herein by reference.

TECHNICAL FIELD

Aspects and implementations of the present disclosure relate to data processing, and more specifically, to identifying feature correspondences among multiple video clips of a dynamic scene.

BACKGROUND

When multiple video cameras capture a dynamic scene from different vantage points, it may be useful to correlate entities (e.g., inanimate objects, persons, etc.) among the video clips captured by the video cameras. For example, if two viewers of a soccer match each take a video of the match, determining that a particular player in the first video and a particular player in the second video are in fact the same player may be useful for a variety of applications (e.g., obtaining three-dimensional coordinates of the player's location, etc.).

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a computer system identifies a first feature in a first video clip of a dynamic scene that is captured by a first video camera, and a second feature in a second video clip of the dynamic scene that is captured by a second video camera. In one implementation, the computer system determines, based on motion in the first video clip and motion in the second video clip, that the first feature and the second feature do not correspond to a common entity.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to determining feature correspondences among multiple video clips of a dynamic scene. In particular, implementations of the present disclosure are capable of identifying features (e.g., image edges, image corners, a wheel of a vehicle, a person's eyes, a person's face, etc.) in two or more video clips of a dynamic scene and determining correspondences between the features (e.g., whether a human face in one video clip and a human face in another video clip in fact correspond to the same person, etc.).

In one implementation, a computer system estimates whether a first feature in a first video clip of a dynamic scene captured by a first video camera and a second feature in a second video clip of the dynamic scene captured by a second video camera are identical or correspond to a common entity (e.g., a particular person, a particular object, etc.) based on motion in the first video clip and motion in the second video clip. For example, if a first video clip of a dynamic scene depicts a human face that is moving and a second video clip of the dynamic scene depicts a stationary human face, then it follows that the faces belong to different people. As another example, if a basketball in a first video clip of a pre-game warm-up is moving in a straight line and a basketball in a second video clip of the pre-game warm-up is moving along a parabolic trajectory, then it follows that the basketballs are not the same (i.e., even though the features in both video clips are visually similar, they do not correspond to a common entity).

As another example, if a first video clip of an apiary depicts a bee that is moving closer to a landmark, and a second video clip of the apiary depicts a bee that is moving further away from the landmark, then it follows that these are different bees. As yet another example, if a first video clip of a dynamic scene depicts a human face whose gaze is moving upward, and a second video clip of the dynamic scene depicts a human face whose gaze is moving downward, then it follows that the faces belong to different people.

In accordance with one implementation of the present disclosure, a two-dimensional matrix is constructed for a pair of video cameras, where each of the rows corresponds to a respective feature identified in one of the video cameras and each of the columns corresponds to a respective feature identified in the other video camera. The matrix is initialized with a value indicating "match" (e.g., the value 1, etc.) in every entry, and subsequently the motion of every feature in frames of the two video clips is tracked. When an inconsistency is detected between the motion (or lack thereof) of a feature in the first video clip and the motion (or lack thereof) of a feature in the second video clip, a value representing "no match" (e.g., zero, etc.) is stored in the matrix entry associated with the two features. This process continues until either (i) all of the frames of the two video clips have been processed, or (ii) the "no match"s in the matrix are sufficient to determine feature correspondences, without having to process more frames of the video clips.

In one aspect, one or more heuristics are used to determine when condition (ii) is satisfied, and when the process has completed (i.e., either condition (i) or (ii) is satisfied), a matching between features in the first video clip and features in the second video clip is determined based on the values of the matrix using a Structure from Motion (SfM) solver. In one implementation, the result of a successful Structure from Motion (SfM) reconstruction may be utilized to further improve an incomplete match matrix (e.g., by eliminating remaining matches that are ambiguous or inconsistent with SfM results, etc.).

In accordance with one implementation of the present disclosure, when there are three or more video clips of the dynamic scene, each captured by a respective video camera, the pairwise processing described above is performed for every pair of video clips, and the pairwise matchings are combined to obtain an overall matching over the features of all the video clips. In one aspect, the relative locations of the video cameras are also determined based on the overall matching and the two-dimensional coordinates of the features in each of the video clips.

Implementations of the present disclosure thus exploit motion similarity over time in order to match features, rather than appearance-based matching techniques of the prior art that utilize appearance similarity. Consequently, implementations of the present disclosure are capable of determining feature correspondences even when features do not look the same from every camera view, as is often the case when different camera views are subject to differences in lighting, shadows, perspective, and so forth. It should be noted that while the present disclosure is described with respect to using motion-based matching only, in some alternative implementations motion-based matching may be employed in conjunction with appearance-based matching techniques to determine feature correspondences. For example, in some such alternative implementations, appearance-based matching may be used to refine results obtained from motion-based matching, while in some other such implementations motion-based matching may be used to refine results obtained from appearance-based matching, while in yet other such implementations, the determination of a feature matching may involve techniques (e.g., heuristics, algorithms, etc.) that draw upon both motion-based and appearance-based approaches synergistically, rather than in a sequential manner.

Figure 1:
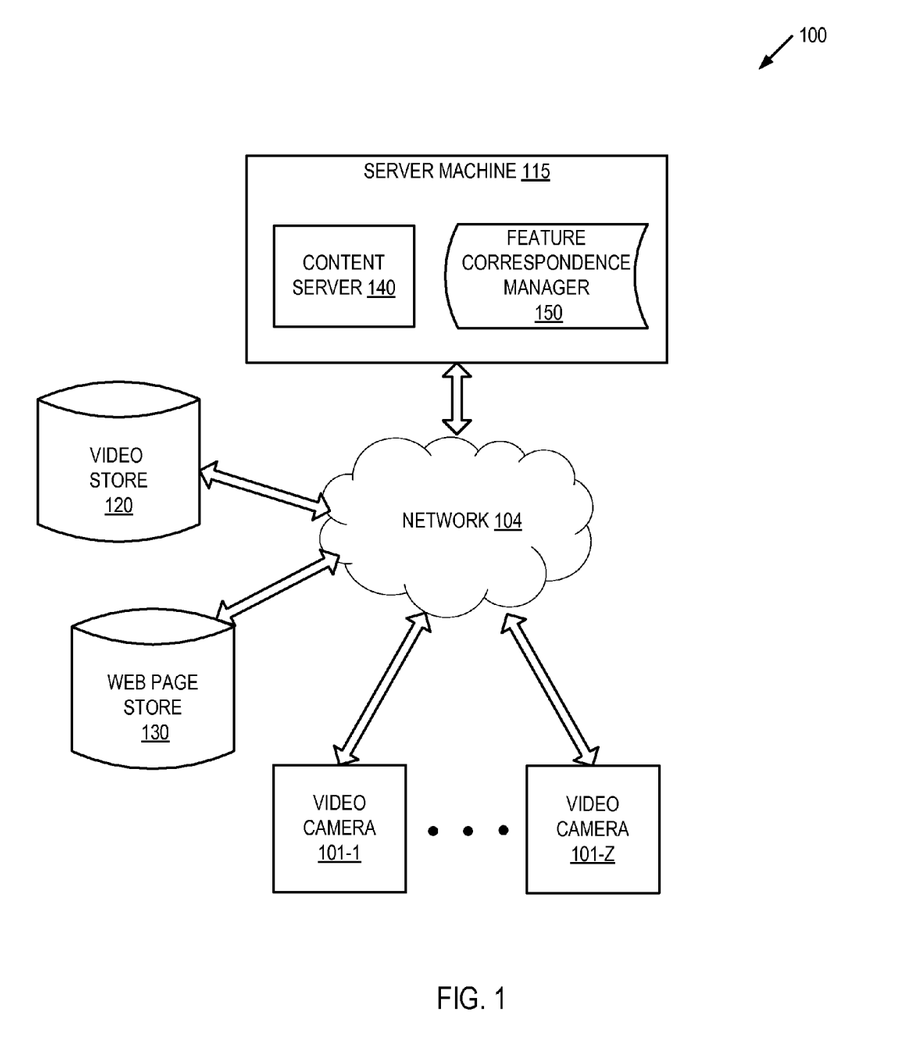
FIG. 1 illustrates an exemplary system architecture, in accordance with one implementation of the present disclosure.

FIG. 1 illustrates an example system architecture 100, in accordance with one implementation of the present disclosure. The system architecture 100 includes a server machine 115, a video store 120, a web page store 130, and video cameras 101-1 through 101-Z connected to a network 104, where Z is a positive integer greater than one. Network 104 may be a public network (e.g., the Internet), a private network (e.g., a local area network (LAN) or wide area network (WAN)), or a combination thereof.

The video cameras 101-1 through 101-Z may be stand-alone "camcorders" with networking capability (e.g., Wi-Fi, Bluetooth, etc.), still digital cameras augmented with video and networking capabilities, client computing devices with embedded video cameras (e.g., smartphones, personal computers (PCs), laptops, tablet computers, etc.), and so forth. In the case where video cameras are embedded in client computing devices, the client computing devices may run an operating system that manages hardware and software and a browser that can access content served by a content server 140 of server machine 115 by navigating to web pages of the content server 140 (e.g., using the hypertext transport protocol (HTTP)). The browser may issue commands and queries to the content server 140, such as commands to upload video clips captured by the video camera, search for video clips, share video clips, and so forth.

The client computing devices may also include applications (or "apps") that are associated with a service provided by content server 140. The applications may access content provided by content server 140, issue commands to content server 140, and so forth without visiting web pages of content server 140.

In general, functions described in one embodiment as being performed by the content server 140 can also be performed on the client computing devices in other embodiments if appropriate. In addition, the functionality attributed to a particular component can be performed by different or multiple components operating together. The content server 140 can also be accessed as a service provided to other systems or devices through appropriate application programming interfaces, and thus is not limited to use in websites.

Server machine 115 may be a rackmount server, a router computer, a personal computer, a portable digital assistant, a mobile phone, a laptop computer, a tablet computer, a camera, a video camera, a netbook, a desktop computer, a media center, or any combination of the above. Server machine 115 includes a content server 140 and a correspondence manager 150. In alternative implementations, the content server 140 and correspondence manager 150 may run on different machines.

Video store 120 is a persistent storage that is capable of storing video clips as well as data structures to tag, organize, and index the video clips. Video store 120 may be hosted by one or more storage devices, such as main memory, magnetic or optical storage based disks, tapes or hard drives, NAS, SAN, and so forth. In some implementations, video store 120 may be a network-attached file server, while in other embodiments video store 120 may be some other type of persistent storage such as an object-oriented database, a relational database, and so forth, that may be hosted by the server machine 115 or one or more different machines coupled to the server machine 115 via the network 104. The video clips stored in the video store 120 may include video clips captured and uploaded by client machines, security cameras, content providers, television broadcasters, and so forth. In some implementations, video store 120 may be provided by a third-party service, while in some other implementations video store 120 may be maintained by the same entity maintaining server machine 115.

Web page store 130 is a persistent storage that is capable of storing web pages and/or mobile app documents for serving to clients, as well as data structures to tag, organize, and index the web pages and/or mobile app documents (e.g., documents provided to mobile apps for rendering on mobile devices). Web page store 130 may be hosted by one or more storage devices, such as main memory, magnetic or optical storage based disks, tapes or hard drives, NAS, SAN, and so forth. In some implementations, web page store 130 may be a network-attached file server, while in other embodiments web page store 130 may be some other type of persistent storage such as an object-oriented database, a relational database, and so forth, that may be hosted by the server machine 115 or one or more different machines coupled to the server machine 115 via the network 104. The web pages and/or mobile app documents stored in the web page store 130 may have embedded content (e.g., video clips stored in video store 120, video clips stored elsewhere on the Internet, etc.) that is generated by users and uploaded by client machines, provided by surveillance services or news organizations, and so forth.

Figure 2:
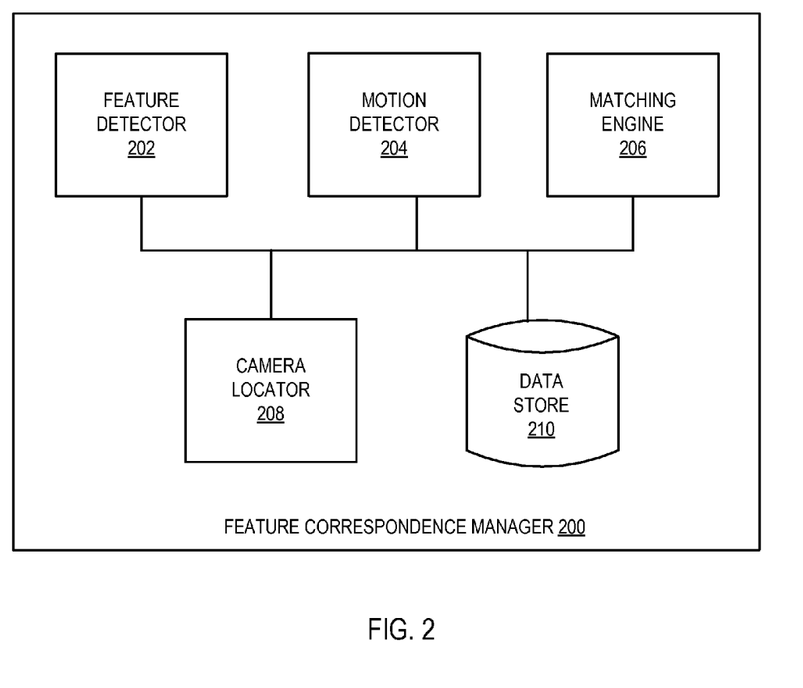
FIG. 2 is a block diagram of one implementation of a feature correspondence manager.
Figure 3:
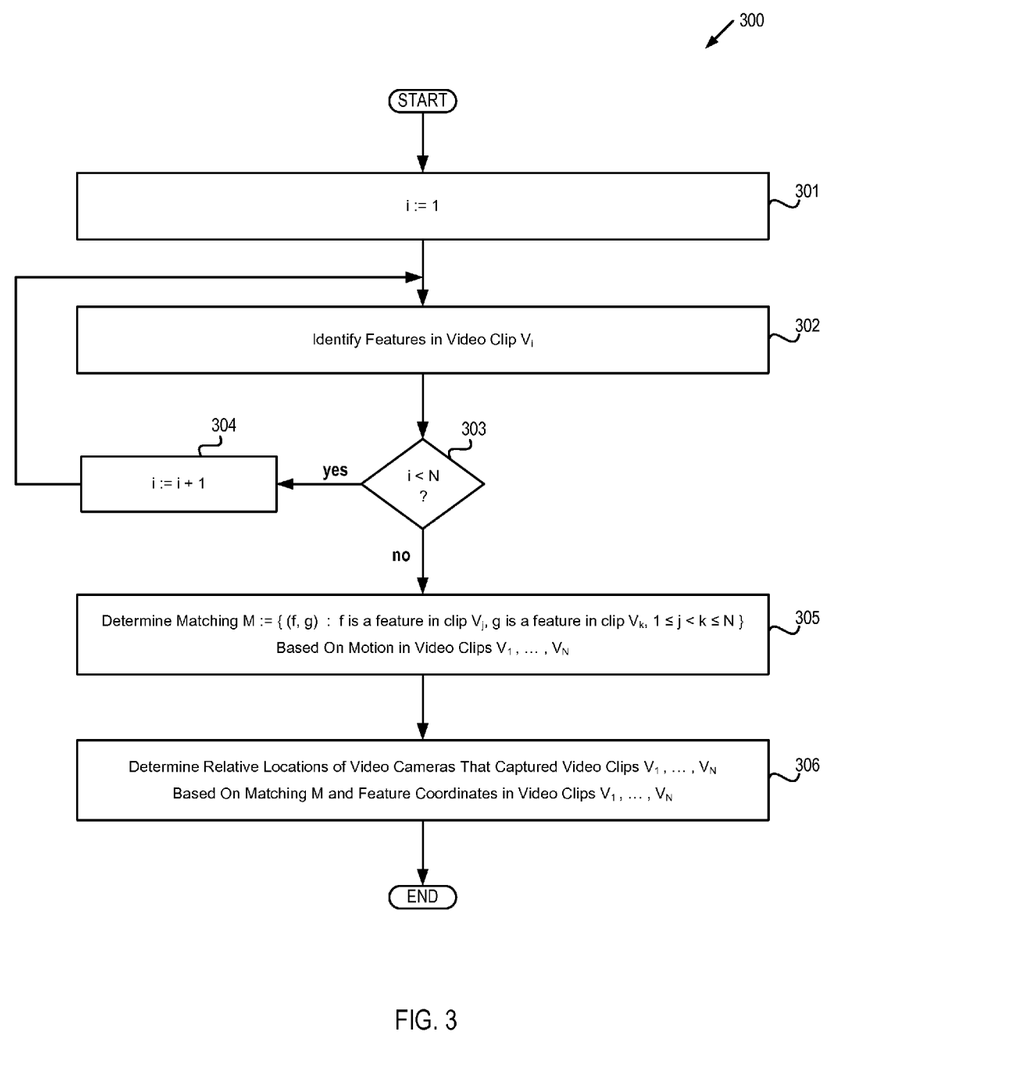
FIG. 3 depicts a flow diagram of aspects of a method for processing a plurality of video clips of a dynamic scene.
Figure 4:
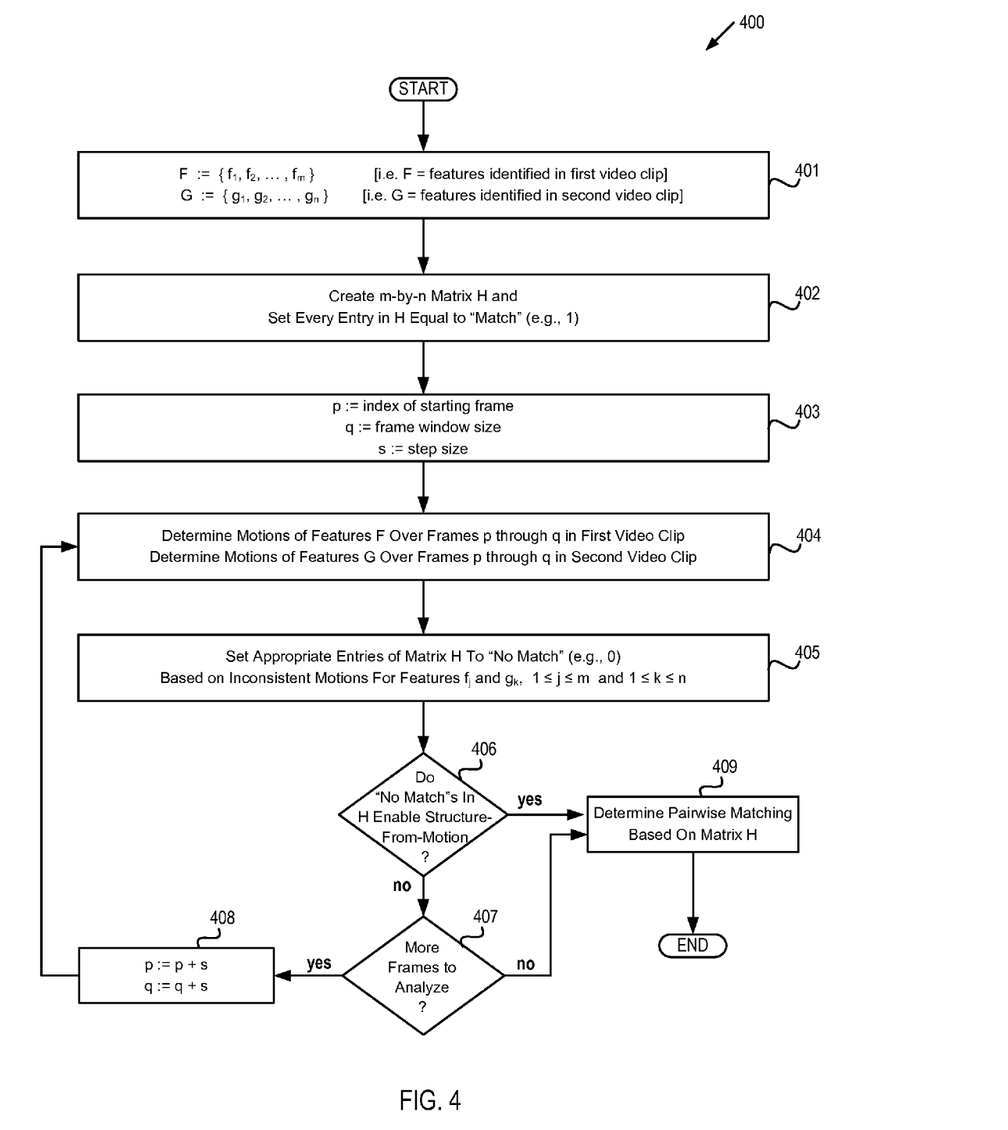
FIG. 4 depicts a flow diagram of aspects of a method for determining a matching between feature sets of two video clips of a dynamic scene.

In accordance with some implementations, feature correspondence manager 150 is capable of identifying features in frames of video clips, detecting motion of features, sets of features, pixels, sets of pixels, and so forth across frames of video clips, determining matchings between features of different video clips of a dynamic scene (even when the features being matched are not visually similar), and determining the relative locations of the video cameras capturing the various video clips of a dynamic scene, as described below with respect to FIGS. 3 and 4. An implementation of feature correspondence manager 150 is described in detail below with respect to FIG. 2.

FIG. 2 is a block diagram of one implementation of a feature correspondence manager. The correspondence manager 200 may be the same as the correspondence manager 150 of FIG. 1 and may include a feature detector 202, a motion detector 204, a matching engine 206, a camera locator 208, and a data store 210. The components can be combined together or separated in further components, according to a particular implementation. It should be noted that in some implementations, various components of correspondence manager 200 may run on separate machines.

The data store 210 may be the same as video store 120, or web page store 130, or both, or may be a different data store (e.g., a temporary buffer or a permanent data store) to hold one or more video clips (e.g., to be processed for obtaining features, detecting motion of features, determining feature correspondences, etc.), one or more data structures representing feature correspondences among video clips, one or more data structures for computing camera locations, one or more web pages by which video clips are uploaded, and so forth. Data store 210 may be hosted by one or more storage devices, such as main memory, magnetic or optical storage based disks, tapes or hard drives, etc.

The feature detector 202 is capable of extracting and identifying features (e.g., an image edge, an image corner, a person's eyes, a person's face, a wheel of a vehicle, etc.) in digital images (e.g., frames of a digital video clip, digital photographs, etc.) using one or more techniques such as principal components analysis, semidefinite embedding, multifactor dimensionality reduction, nonlinear dimensionality reduction, Isomap-based techniques, partial least squares, independent component analysis, and so forth. Some operations of feature detector 202 are described in more detail below with respect to FIG. 3.

The motion detector 204 is capable of detecting motion (or lack of motion) of individual pixels, sets of pixels, individual features, sets of features, pixels, etc. across successive frames of a video clip using one or more techniques such as optical flow, spatiotemporal texture vectors, Stauffer-Grimson models, and so forth. Some operations of motion detector 204 are described in more detail below with respect to FIG. 4.

Matching engine 206 is capable of determining a matching between features of various video clips of a dynamic scene (e.g., determining that a particular human face in one video clip matches a particular human face in another video clip, etc.) based on motion in the various video clips. Some operations of matching engine 206 are described in more detail below with respect to FIGS. 3 and 4.

Camera locator 208 is capable of determining the relative locations of video cameras that capture different video clips of a dynamic scene using one or more techniques such as Structure from Motion (SfM). Some operations of camera locator 208 are described in more detail below with respect to FIG. 3.

FIG. 3 depicts a flow diagram of aspects of a method 300 for processing a plurality of video clips of a dynamic scene. In accordance with one implementation, each of the video clips is captured by a respective video camera, and the plurality of video clips is referred to as $V_1, \ldots, V_N$, where N is a positive integer greater than one. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more blocks of FIG. 3 may be performed by another machine.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

It should be noted that the various video clips of the dynamic scene are typically synchronized in time (e.g. using time stamps, audio tracks, or visual events), and in method 300 it is assumed that the video clips have been synchronized. In some alternative implementations where such is not the case, an initial block in which the video clips are synchronized may be prepended to method 300.

It should further be noted that the motion-based feature matching techniques of the present disclosure may also be employed to synchronize video clips, or to refine an initial synchronization based on techniques of the prior art. More particularly, because the correct time offset for synchronization will exhibit the best matching motion, this time offset can be determined by maximizing the number of motion-matched features found over various candidate time offsets. It should further be noted that video clips may be synchronized in this manner in any application, and not just in applications where feature matching is performed for other purposes (e.g., identifying people across the video clips, etc.).

At block 301, index variable i is initialized to one. At block 302, the features in video clip $V_i$ are identified. In one implementation, block 302 is performed by feature detector 202.

Block 303 branches based on whether i is less than N, the number of video clips of the dynamic scene. If i is less than N, execution proceeds to block 304, otherwise execution continues at block 305. At block 304, variable i is incremented and execution continues back at block 302.

At block 305, a matching M is determined based on motion in video clips $V_1, \ldots, V_N$. The motion may be with respect to individual features, sets of features, individual pixels, sets of pixels, etc., and may comprise one or more of the following:

translational motion;
rotational motion;
a change in scale;
a change in appearance (e.g., the contents of a display of a laptop computer in the dynamic scene, etc.);
a change in color (e.g., a vehicle's backup light might change color when the vehicle begins moving in reverse, etc.);
a change in lighting (e.g., a person might move to a location in brighter lighting, etc.); or
any change in pixel values.

In one implementation, matching M is a set of ordered pairs (f, g), where f is a feature in one of the video clips $V_j$, g is a feature in some other video clip $V_k$, and $1 \leq j < k \leq N$. In other words, each ordered pair in matching M indicates a correspondence between a first feature in a first video clip and a second feature in a second video clip. An implementation of a method for determining ordered feature pairs for two video clips is described in detail below with respect to FIG. 4. In one aspect, the implementation of FIG. 4 is performed for each pair of video clips at block 305, and the resulting "pairwise matchings" obtained from the multiple executions of FIG. 4 are combined to form the "overall" matching M over all of the video clips. It should be noted that in some other implementations, matching among three or more cameras may be performed directly via alternative techniques rather than built up from pairwise matching. It should further be noted that in some other implementations, appearance-based matching techniques may be employed in conjunction with motion-based matching at block 305 to determine or refine matching M.

At block 306, the relative locations of the N video cameras capturing video clips $V_1, \ldots, V_N$ are determined based on matching M and the two-dimensional coordinates of the features in frames of video clips $V_1, \ldots, V_N$. In one implementation, the relative locations are determined via a Structure from Motion (SfM) technique that estimates three-dimensional structures from two-dimensional image sequences. This information can then be used for three-dimensional object modeling, rendering from arbitrary vantage points, object recognition, and so forth. In one implementation, block 306 is performed by camera locator 208.

FIG. 4 depicts a flow diagram of aspects of a method 400 for determining a matching between feature sets of two video clips of a dynamic scene. The method is performed by processing logic that may comprise hardware (circuitry, dedicated logic, etc.), software (such as is run on a general purpose computer system or a dedicated machine), or a combination of both. In one implementation, the method is performed by the server machine 115 of FIG. 1, while in some other implementations, one or more blocks of FIG. 4 may be performed by another machine.

At block 401, variable F is initialized to the set of features $\{f_1, f_2, \ldots, f_m\}$ identified in a first video clip, where m is a positive integer, and variable G is initialized to the set of features $\{g_1, g_2, \ldots, g_n\}$ identified in a second video clip, where n is a positive integer.

At block 402, an m-by-n matrix H is created and every entry in H is set to a value indicating a "match" (e.g., value 1, etc.). Thus, it is tentatively assumed at this point that every feature of the first video clip matches every feature of the second video clip, and the remainder of the method of FIG. 4 is devoted to determining, based on motion, matches between features that are not possible, and accordingly overwriting the corresponding matrix entry with a value indicating "no match" (e.g., a zero, etc.).

Block 403 is concerned with initializing variables associated with a sliding frame window for analyzing motion. More particularly, variable p is initialized to the index of the starting frame (i.e., the frame at which analysis of the video clip starts), and variable q is initialized to a desired frame window size. The value of variable p represents the index of the first frame of the current window, and the value of variable q represents the index of the last frame of the current window. For example, if the window size is 5, and p is initialized to 1, then initially the window starts at index 1 and ends at index 5.

Block 403 also initializes variable s to a desired step size for advancing the frame window. For example, if the window size is 5, p is initialized to 1, and s is initialized to 1, then the first window will be frames 1 through 5, the second window will be frames 2 through 6, and so forth. As another example, if the window size is 5, p is initialized to 1, and s is initialized to window size 5, then the first window will be frames 1 through 5, the second window will be frames 6 through 10, and so forth.

At block 404, the motions of each feature of set F over frames p through q in the first video clip are determined, and the motions of each feature of set G over frames p through q in the second video clip are determined. In one implementation, the motions may comprise one or more of the following:
translational motion,
rotational motion,
a change in scale,
a change in appearance,
a change in color,
a change in lighting, or
any change in pixel values.
In one implementation, block 404 is performed by motion detector 204.

At block 405, appropriate entries of matrix H are set to "no match" (e.g., the value zero, etc.) based on inconsistent feature motions in the current frame window (i.e., frames p through q in the first and second video clips). More particularly, in one implementation, whenever the motion of a feature $f_j$ of the first video clip and the motion of a feature $g_k$ of the second video clip are inconsistent, then the entry of H at row j and column k is set to "no match." In one implementation, block 405 is performed by matching engine 206.

Block 406 checks whether the "no match"s in matrix H are sufficient to enable computation of the relative locations of the two video cameras via Structure from Motion (SfM). For example, if every row of matrix H has a single "match" value and the remaining values in the row are all "no match," then correspondences between the features of the two video clips are uniquely determined and the camera locations can be computed deterministically from these correspondences.

It should be noted that Structure from Motion (SfM) computations can also be performed with partial, incomplete information in matrix H. For example, SfM computations may be performed when time has run out, or when video frames have run out, or when the percentage of "no match"s in each row is above a first threshold and the percentage of "no match"s in each column is below a second threshold, or when there are a high number of features and/or a low number of ambiguous matches, or when matches are well-distributed in space, when there are a sufficient number of matches with high confidence, and so forth. As another example, in some implementations a heuristic comprising the following computations may be used in the determination of block 406:

quantify the motion across frames for one or more corresponding feature pairs;

quantify the total motion across frames;

compute a function (e.g., a difference, a ratio, etc.) that compares the total motion to one or more of the pairwise motions (e.g., a ratio of a single pairwise motion to the total motion, a difference between the total motion and a sum of the pairwise motions, etc.);

compare the computed function to a threshold; and determine whether matrix H has sufficient information based on the comparison between the computed function and the threshold.

It should further be noted that when Structure from Motion (SfM) reconstruction is successful, the result of the SfM reconstruction may be utilized to further improve an incomplete match matrix (e.g., by eliminating remaining matches that are ambiguous or inconsistent with SfM results, etc.). Similarly, as described above, the SfM reconstruction may be utilized to further improve an incomplete match matrix that is obtained via one or more appearance-based matching techniques.

If the check at block 406 is affirmative, execution continues at block 409, otherwise execution proceeds to block 407. In one implementation, block 406 is performed by matching engine 206.

Block 407 checks whether there are more frames remaining in the first and second video clips. If there are more frames remaining, execution proceeds to block 408, otherwise execution continues at block 409.

At block 408, variables p and q are incremented by step size s. After block 408, execution continues back at block 404.

At block 409, a pairwise matching for the first and second video clips is determined based on the contents of matrix H. In one implementation, the possible matches in matrix H are fed into a Structure from Motion (SfM) solver that obtains the matching.

It should be noted that in some alternative implementations, rather than using a process of elimination to discard implausible matches, matches may be determined in a "positive" manner (e.g., using a library of plausible matches, using a rule-based system, etc.). It should also be noted that in some alternative implementations, rather than representing and storing match data using a matrix, some other type of data structure might be utilized (e.g., a list of lists containing only possible matches, etc.).

It should further be noted that cameras may not necessarily be static—for example, cameras may be mounted to robotic pan/tilt/zoom systems or other types of motion control systems, or may be held by people in a non-stationary manner. Moreover, video creators may help initialize camera positions, and event participants or observers may intentionally help guide camera choices (e.g., via head-mounted displays, etc.). Further, in some implementations cameras may be grouped into clusters (or "pods") of two or more cameras, and cameras within the same cluster may have their positions reconstructed using alternative methods given their small baseline and similarity of views.

Figure 5:
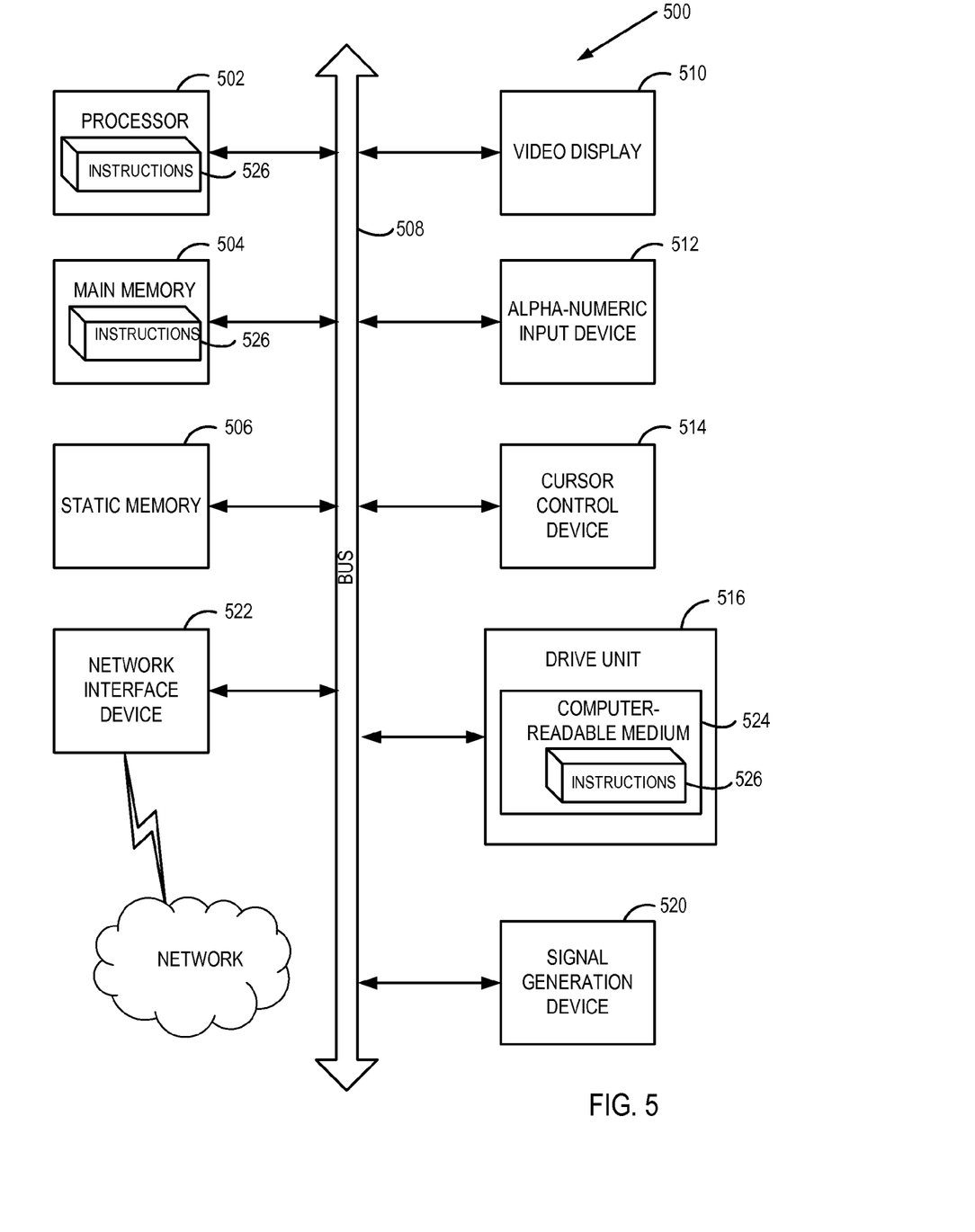
FIG. 5 depicts a block diagram of an illustrative computer system operating in accordance with aspects and implementations of the present disclosure.

FIG. 5 illustrates an exemplary computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions executed by feature correspondence manager 225, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "identifying," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, in a first video clip of a dynamic scene that is captured by a first video camera, a first feature;
   identifying, in a second video clip of the dynamic scene that is captured by a second video camera, a second feature;
   synchronizing in time, by a computer system, the first video clip and the second video clip;
   detecting, by the computer system, a first motion of the first feature across two or more first frames of the first video clip and a second motion of the second feature across two or more second frames of the second video clip that correspond to the two or more first frames of the first video clip based on the synchronizing; and
   determining, by the computer system, based on the first motion in the first video clip and the second motion in the second video clip, that the first feature and the second feature do not correspond to a common entity, the first motion in the first video clip and the second motion in the second video clip corresponding to one or more common points in time in the first video clip and the second video clip.

2. The method of claim 1 wherein the determining is based on a first movement of the first feature in the first video clip and on a second movement of the second feature in the second video clip and not on a visual similarity between the first feature and the second feature.

3. The method of claim 2 wherein the determining that the first feature and the second feature do not correspond to a common entity comprises determining whether the movement of the first feature and the movement of the second feature are consistent.

4. The method of claim 2 wherein the first feature is a human facial feature, and wherein the movement of the first feature comprises a change in head orientation.

5. The method of claim 2 wherein the movement of the first feature comprises a translational movement.

6. The method of claim 2 wherein the movement of the first feature comprises a change of appearance.

7. The method of claim 1 wherein the determining is based on at least one of: a lack of movement of the first feature in the first video clip, or a lack of movement of the second feature in the second video clip.

8. The method of claim 1 further comprising generating a matching between N features in the first video clip and N features in the second video clip, wherein N is a positive integer.

9. The method of claim 8 further comprising determining relative locations of the first video camera and the second video camera based on the matching.

10. The method of claim 8 wherein the generating of the matching comprises eliminating an inconsistent match between a corresponding first feature in the first video clip and a corresponding second feature in the second video clip based on a Structure from Motion reconstruction.

11. The method of claim 1 wherein the determining that the first feature and the second feature do not correspond to a common entity is further based on an appearance-based matching of the first video clip and the second video clip.

12. An apparatus comprising:
   a memory to store:
      a first video clip of a dynamic scene that is captured by a first video camera; and
      a second video clip of the dynamic scene that is captured by a second video camera; and a processor to:
  identify a first feature in the first video clip;
  identify a second feature in the second video clip;
  synchronize in time the first video clip and the second video clip;
  detect a first motion of the first feature across two or more first frames of the first video clip and a second motion of the second feature across two or more second frames of the second video clip that correspond to the two or more first frames of the first video clip based on synchronizing of the first video clip and the second video clip; and
  determine, based on the first motion in the first video clip and the second motion in the second video clip, that the first feature and the second feature do not correspond to a common entity, the first motion in the first video clip and the second motion in the second video clip corresponding to one or more common points in time in the first video clip and the second video clip.

13. The apparatus of claim 12 wherein determining that the first feature and the second feature do not correspond to a common entity is based on a first movement of the first feature in the first video clip and on a second movement of the second feature in the second video clip and not on a visual similarity between the first feature and the second feature.

14. The apparatus of claim 13 wherein the determining that the first feature and the second feature do not correspond to a common entity comprises determining whether the movement of the first feature and the movement of the second feature are consistent.

15. The apparatus of claim 13 wherein the movement of the first feature comprises a translational movement.

16. The apparatus of claim 13 wherein the movement of the first feature comprises a change of color.

17. The apparatus of claim 12 wherein determining that the first feature and the second feature do not correspond to a common entity is based on at least one of: a lack of movement of the first feature in the first video clip, or a lack of movement of the second feature in the second video clip.

18. The apparatus of claim 12 wherein the processor is further to generate a matching between N features in the first video clip and N features in the second video clip, wherein N is a positive integer.

19. The apparatus of claim 18 wherein the processor is further to determine relative locations of the first video camera and the second video camera based on the matching.

20. The apparatus of claim 18 wherein generating of the matching comprises eliminating an inconsistent match between a corresponding first feature in the first video clip and a corresponding second feature in the second video clip based on a Structure from Motion reconstruction.

21. The apparatus of claim 12 wherein determining that the first feature and the second feature do not correspond to a common entity is further based on an appearance-based matching of the first video clip and the second video clip.

22. A non-transitory computer-readable storage medium having instructions stored therein, which when executed, cause a computer system to perform operations comprising:
  identifying, in a first video clip of a dynamic scene that is captured by a first video camera, a first feature;
  identifying, in a second video clip of the dynamic scene that is captured by a second video camera, a second feature;
  synchronizing in time, by the computer system, the first video clip and the second video clip;
  detecting, by the computer system, a first motion of the first feature across two or more first frames of the first video clip and a second motion of the second feature across two or more second frames of the second video clip that correspond to the two or more first frames of the first video clip based on the synchronizing; and
  determining by the computer system, based on the first motion in the first video clip and the second motion in the second video clip, that the first feature and the second feature do not correspond to a common entity, the first motion in the first video clip and the second motion in the second video clip corresponding to one or more common points in time in the first video clip and the second video clip.

23. The non-transitory computer-readable storage medium of claim 22, wherein the determining is based on a first movement of the first feature in the first video clip and on a second movement of the second feature in the second video clip and not on a visual similarity between the first feature and the second feature.

24. The non-transitory computer-readable storage medium of claim 23, wherein the determining that the first feature and the second feature do not correspond to a common entity comprises determining whether the movement of the first feature and the movement of the second feature are consistent.

25. The non-transitory computer-readable storage medium of claim 23, wherein the movement of the first feature comprises a change in scale.

26. The non-transitory computer-readable storage medium of claim 23, wherein the movement of the first feature comprises a change in lighting.

27. The non-transitory computer-readable storage medium of claim 22, wherein the determining is based on at least one of: a lack of movement of the first feature in the first video clip, or a lack of movement of the second feature in the second video clip.

28. The non-transitory computer-readable storage medium of claim 22, wherein the operations further comprise generating a matching between N features in the first video clip and N features in the second video clip, wherein N is a positive integer.

29. The non-transitory computer-readable storage medium of claim 28, wherein the operations further comprise determining relative locations of the first video camera and the second video camera based on the matching.

30. The non-transitory computer-readable storage medium of claim 28 wherein the generating of the matching comprises eliminating an inconsistent match between a corresponding first feature in the first video clip and a corresponding second feature in the second video clip based on a Structure from Motion reconstruction.

31. The non-transitory computer-readable storage medium of claim 22 wherein the determining that the first feature and the second feature do not correspond to a common entity is further based on an appearance-based matching of the first video clip and the second video clip.

* * * * *